UNITED STATES PATENT OFFICE.

OTTOKAR HOFMANN, OF MONITOR, CALIFORNIA.

EXTRACTING METALS FROM ORES.

SPECIFICATION forming part of Letters Patent No. 223,913, dated January 27, 1880.

Application filed August 23, 1879.

*To all whom it may concern:*

Be it known that I, OTTOKAR HOFMANN, of Monitor, county of Alpine, and State of California, have invented an Improved Process for the Extraction of Precious Metals from Ores; and I hereby declare the following to be a full, clear, and exact description thereof.

My invention relates to an improved process for the extraction of precious metals from their ores, and is intended more particularly for beneficiating that class of ores containing both gold and silver in addition to base metal.

It consists in a peculiar treatment of the ore: first, by leaching, for the removal of the silver, and then by chlorination, for the removal of the gold. The ore is first submitted to a chloridizing roasting; and the base metals are leached out, the latter operation being performed in a novel manner, to prevent loss of chloride of silver with the base metals, and after the base metals are removed the silver is obtained by leaching, in the usual way. After this operation is over the mass is thoroughly washed to remove all chemical salts, and then impregnated and left in contact with chlorine gas, after which the gold is extracted by water and precipitated with sulphate of iron.

The ore to be treated is first subjected to a chloridizing roasting in a reverberatory or mechanical furnace, in order to chloridize the silver and convert the gold into its native state. After roasting, the ore is moistened and charged into tanks with filter-bottoms, where it is leached with water to extract all soluble base-metal chlorides. The water, if saturated with chlorides, dissolves the chloride silver, which, however, is precipitated again by diluting the solution with water. The consequence of this is, that in case the water is introduced in the tank, as is usually done, on top of the ore, and permitted to filter through said ore, it becomes saturated with base-metal chlorides, so that the first solution running out of the tank dissolves considerable silver, which is lost. To avoid this loss I introduce the water under the filter-bottom, and by means of light pressure force it to ascend from the bottom to the top through the ore. In this way I obtain the concentrated solution in the tank above the ore, and by diluting the same by a stream of clear water and permitting the water to flow down again and out from under the filter the chloride of silver is precipitated on and through the ore and is extracted at the next operation.

In leaching the silver the operation is performed, in the usual way, by leaching the ore with a solution of hyposulphite of lime and precipitating the silver with polysulphide of calcium.

After the silver is thus extracted the ore is thoroughly washed or leached with clear water, in order to remove all hyposulphite of lime or soda. This proceeding is of great importance for the subsequent gold extraction, since I have found that the presence of even small quantities of hyposulphite of lime or soda in a solution of chloride of gold prevents the precipitation of the gold by sulphate of iron.

Having ascertained by test that no more hyposulphite of lime is present, the ore is removed from the tank to a dry-kiln, where it is left for a short time till the surplus water has evaporated, whence it is charged back to the tank still moist and warm.

The ore, having been treated in this manner, is now impregnated with chlorine gas, as described in Plattner's gold-chlorination process, and is left in contact from twelve to twenty-four hours. The chloride of gold is extracted by water and precipitated with sulphate of iron.

If the ore is rich in both silver and gold, it is of the greatest importance to extract the silver first, and then the gold. If the roasted ore is impregnated with chlorine gas before extracting the silver, the gas has no opportunity to attack the gold, as the main portion of it is incrusted by chloride of silver, and the consequences are, that hardly more than fifty per cent. can be extracted. On the other hand, if the silver is first extracted and then the gold, the gold becomes clear and bright and free of all incrustation, which facilitates the action of the gas to a great extent and permits a very close extraction of the gold. The fineness of the gold so obtained is naturally higher than that obtained by the regular Plattner process, since the silver and base metals are removed, and it ranges from 970 to 986½ fine.

After the gold has been extracted the ore may be subjected to a second leaching with hyposulphite of lime, in order to extract that portion of the silver which by an imperfect roasting had not been converted into a chloride, but which had been chloridized during the impregnation with cold chlorine gas. The second leaching, however, would only be necessary when treating exceedingly rich ores.

Difficulty has heretofore been encountered by metallurgists in treating auriferous silver ores successfully by other processes than smelting, more especially in case the percentage of gold is high and reaches almost that of silver. Mines, therefore, having ore with both silver and gold in any quantity have failed of success from inability to treat the ore. Many attempts have been made to reduce the auriferous silver ore by amalgamation, leaching, and other processes, but without success.

It will be seen that I combine the separate operations of silver-leaching with hyposulphite of lime and gold-chlorination by Plattner's process in a peculiar and novel manner, which enables me to successfully treat this class of ores. Plattner, however, uses oxidizing roasting to free the gold for his process; but chlorine being a much more powerful agent, the operation is materially shortened by substituting the chloridizing for the oxidizing roasting.

In so far as this application is concerned, I distinctly disclaim all steps and consecutive steps in the described process other than is set out in my claim, reserving the right to cover all such as are novel in other applications I propose to file.

Having thus described my invention, what I claim as new, and desire to secure by Letters Patent, is—

In the treatment of auriferous silver ores and argentiferous gold ores, the described process, consisting in, first, subjecting the ore to a chloridizing roasting, removing the base-metal chlorides by leaching them, by passing a stream of water upward through the mass, diluting the solution above and passing it down through the ore again, to prevent the base-metal chlorides from carrying off the silver chlorides, and then leaching out the silver, and, after washing the mass to remove traces of hyposulphite of lime, treating it in the presence of chlorine gas to dissolve the gold, which is afterward precipitated by sulphate of iron, substantially as herein described.

In witness whereof I have hereunto set my hand.

OTTOKAR HOFMANN.

Witnesses:
 D. R. HAWKINS,
 CHAS. O. ALLEN.